(12) United States Patent
Soucy

(10) Patent No.: US 7,093,623 B2
(45) Date of Patent: Aug. 22, 2006

(54) METHODS OF PROVIDING REFUELING FOR FUEL CELL-POWERED DEVICES

(75) Inventor: Alan J. Soucy, Monte Sereno, CA (US)

(73) Assignee: The Gillette Company, Boston, MA (US)

( * ) Notice: Subject to any disclaimer, the term of this patent is extended or adjusted under 35 U.S.C. 154(b) by 203 days.

(21) Appl. No.: 10/607,699

(22) Filed: Jun. 27, 2003

(65) Prior Publication Data

US 2004/0265652 A1 Dec. 30, 2004

(51) Int. Cl.
*B65B 1/04* (2006.01)

(52) U.S. Cl. .................. 141/2; 141/1; 141/18; 141/383

(58) Field of Classification Search ............... 141/1, 141/2, 18, 311 R, 383; 429/13, 50
See application file for complete search history.

(56) References Cited

U.S. PATENT DOCUMENTS

| | | | |
|---|---|---|---|
| 4,046,956 | A | 9/1977 | Fanciullo |
| 4,593,534 | A | 6/1986 | Bloomfield |
| 4,673,624 | A | 6/1987 | Hockaday |
| 4,810,597 | A | 3/1989 | Kumagai et al. |
| 4,904,548 | A | 2/1990 | Tajima |
| 5,460,896 | A | 10/1995 | Takada et al. |
| 5,523,177 | A | 6/1996 | Kosek et al. |
| 5,573,866 | A | 11/1996 | Van Dine et al. |
| 5,599,638 | A | 2/1997 | Surampudi et al. |
| 5,631,099 | A | 5/1997 | Hockaday |
| 5,723,228 | A | 3/1998 | Okamoto |
| 5,759,712 | A | 6/1998 | Hockaday |
| 5,766,786 | A | 6/1998 | Fleck et al. |
| 5,773,162 | A | 6/1998 | Surampudi et al. |
| 5,795,668 | A | 8/1998 | Banerjee |
| 5,916,699 | A | 6/1999 | Thomas et al. |
| 5,925,476 | A | 7/1999 | Kawatsu |
| 5,945,231 | A | 8/1999 | Narayanan et al. |
| 5,952,117 | A | 9/1999 | Colborn et al. |
| 5,992,008 | A | 11/1999 | Kindler |
| 6,232,010 | B1 | 5/2001 | Cisar et al. |
| 6,265,093 | B1 | 7/2001 | Surampudi et al. |
| 6,296,964 | B1 | 10/2001 | Ren et al. |

(Continued)

FOREIGN PATENT DOCUMENTS

CA 2 467 093 A1 5/2003

(Continued)

OTHER PUBLICATIONS

Maynard et al. Miniaturized Fuel Cells for Portable Power, Presented at Conference on Small Fuel Cells and Battery Technologies 2000, New Orleans, LA, all pages.

(Continued)

*Primary Examiner*—Timothy L. Maust
(74) *Attorney, Agent, or Firm*—Cesari and McKenna LLP

(57) ABSTRACT

Methods of providing for refueling of direct oxidation fuel cells. An electrical appliance which is powered by a fuel cell includes a fitting which provides sealed access to a fuel reservoir. A canister which contains fuel is engaged with the fitting in order to transfer fuel to the reservoir. The canisters are preferably distributed to users through conventional retail and/or on-line distribution channels. Alternatively, the fuel reservoir within the appliance is made in the form of a removable cartridge. When the cartridge is spent, a user may remove it and replace it with a new one. The fitting, canister and cartridge are preferably based on a standardized specification which enhances market adoption, user convenience and ease of use.

7 Claims, 3 Drawing Sheets

U.S. PATENT DOCUMENTS

| | | | |
|---|---|---|---|
| 6,322,917 B1 | 11/2001 | Acker | |
| 6,326,097 B1 * | 12/2001 | Hockaday | 429/34 |
| 6,350,540 B1 | 2/2002 | Sugita et al. | |
| 6,410,180 B1 | 6/2002 | Cisar et al. | |
| 6,420,059 B1 | 7/2002 | Surampudi et al. | |
| 2002/0155341 A1 | 10/2002 | Finkehshtain et al. | |
| 2002/0197522 A1 | 12/2002 | Lawrence et al. | |

FOREIGN PATENT DOCUMENTS

| | | |
|---|---|---|
| CA | 2 467 093 AA | 5/2003 |
| EP | 1 087 455 A2 | 3/2001 |
| EP | 1 313 160 A1 | 5/2003 |
| SU | 1610522 A | 11/1999 |
| WO | WO 97/50140 A | 12/1997 |

OTHER PUBLICATIONS

Sharke, Paul. Pocket-Size PEMs, Http://www.memagazine.org/contents/current/features/pems/pems.html, Jul. 25, 2000, all pages.

Gottesfeld et al. "Polymer Electrolyte Fuel Cells as Potential Power Source for Portable Electronic Devices", pp. 487-517.

Ren, Xiaoming et al. Methanol Cross-Over in Direct Methanol Fuel Cells, Electronic and Electrochemical Materials and Devices, MST-11, MS-D429, Los Alamos National Laboratory, NM, pp. 284-293.

Narayanan et al. Electrochemical Characteristics of Carbon-Supported Pt, Pt—Sn, Pt—Ru Electrodes for the Oxidation of Methanol and Formaldehyde, From Fuel Cell Program and Abstracts, 1992 Fuel Cell Seminar, pp. 233-236 and 461-464.

Notification of Transmittal of Transmittal of the International Search Report and the Written Opinion of the International Search Authority, PCT/US2004/020708, Date of Mailing Oct. 14, 2005.

* cited by examiner

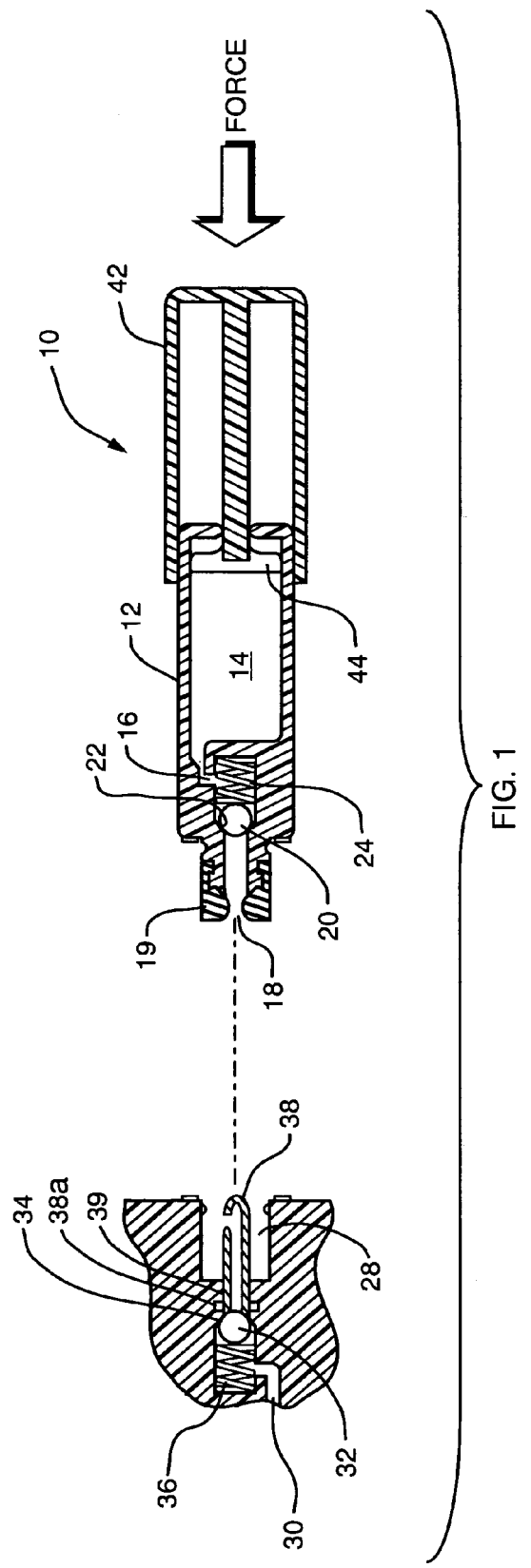
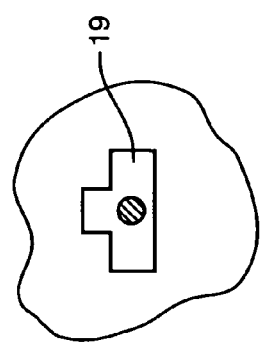

METHODS OF PROVIDING REFUELING FOR FUEL CELL-POWERED DEVICES

BACKGROUND OF THE INVENTION

1. Field of the Invention

This invention relates to the refueling of fuel cells used in small electrical devices. More particularly it relates to methods of refueling fuel cells by means of standardized refueling canisters or removable fuel cartridges marketed through conventional channels, such as those that provide batteries for small electrical devices.

2. Background Information

A number of business organizations have announced the proposed marketing of fuel cells as substitutes and/or replacements for electrical storage batteries used in small appliances, such as wireless telephone handsets, notebook computers and even flash-lights. To provide a sufficient energy density in their fuel storage reservoirs these fuel cells are powered a fuel, such as methanol, that reacts in the cells to provide the hydrogen that is directly involved in electrical generation.

Since these cells are replacements for electric batteries, the fuel cells, initially at least, will preferably have the same form factors as the batteries and will have the same electrical contacts to facilitate integration with the appliances powered by them.

SUMMARY OF THE INVENTION

We have devised an improved refueling arrangement more in tune with the applications of the devices provided by these fuel cells. In accordance with a first embodiment of the invention, we propose to recharge the fuel cells in situ by connecting them to fuel-supply canisters. The canisters may preferably take the form of relatively small vessels that may preferably be readily procured from conventional retail outlets or on-line sources and kept on hand by the users of the fuel cell powered appliances. Then, when an appliance containing a fuel cell runs low on fuel, the user can refill the fuel cell reservoir from one of the canisters and continue to use the appliance without interrupting its operation.

Preferably, the canister has a discharge fitting that mates with an inlet fitting connected to the fuel cell's fuel reservoir. When the fittings are engaged with each other, the fitting mechanism provides a sealed fluid path from the interior of the canister to the reservoir. The fuel is then pumped from the canister to the reservoir, after which the fittings are disengaged. It is also preferred that the inlet and discharge fittings substantially conform to a standard specification, which is widely adopted by both appliance and fuel cell manufacturers, thus providing enhanced compatibility and convenience for users. Spent canisters may disposed of or, alternatively, returned to a designated facility to be refilled or recycled.

Various fuel cells may have different requirements for fuel composition. For example, if methanol is the fuel, fuel cells may require different mixtures of methanol, fuel additives and water. Accordingly, the canisters and the fuel-cell inlet fittings may be provided with mechanical or electronic key arrangements such that only canisters that are authorized may be used to refuel a particular fuel cell. For fuel cell manufacturers, appliance manufacturers and end users alike, such authorization is important in terms of safety and performance as it tends to prevent the introduction of an improper fuel type or mixture.

In accordance with a second embodiment of the invention, the fuel cell's fuel reservoir is constructed in the form of a cartridge which is preferably integrated with, but removable from, an appliance powered by the fuel cell. Initially, a cartridge which is full of fuel is installed in an appliance. Once the cartridge's fuel is exhausted (or nearly so), or possibly at another time that may be more convenient for a user, the cartridge may be removed by the user and a full one installed in its place. Exhausted cartridges may be disposed of or returned to a designated facility for recycling or refilling. As described above in connection with the canisters, the cartridges are preferably provided with mechanical or electronic key arrangements such that only authorized cartridges may be used to supply fuel to the fuel cell.

BRIEF DESCRIPTION OF THE DRAWINGS

The invention description below refers to the accompanying drawings, of which:

FIG. 1 is an axial section of a fuel canister that can be used in practicing the invention, and a fragmentary axial section of a fuel cell reservoir inlet that mates with the canister, which is constructed in accordance with a first embodiment of the present invention;

FIG. 2 is an end view of the reservoir inlet of FIG. 1, illustrating a keying arrangement;

DETAILED DESCRIPTION OF AN ILLUSTRATIVE EMBODIMENT

Figure 3:
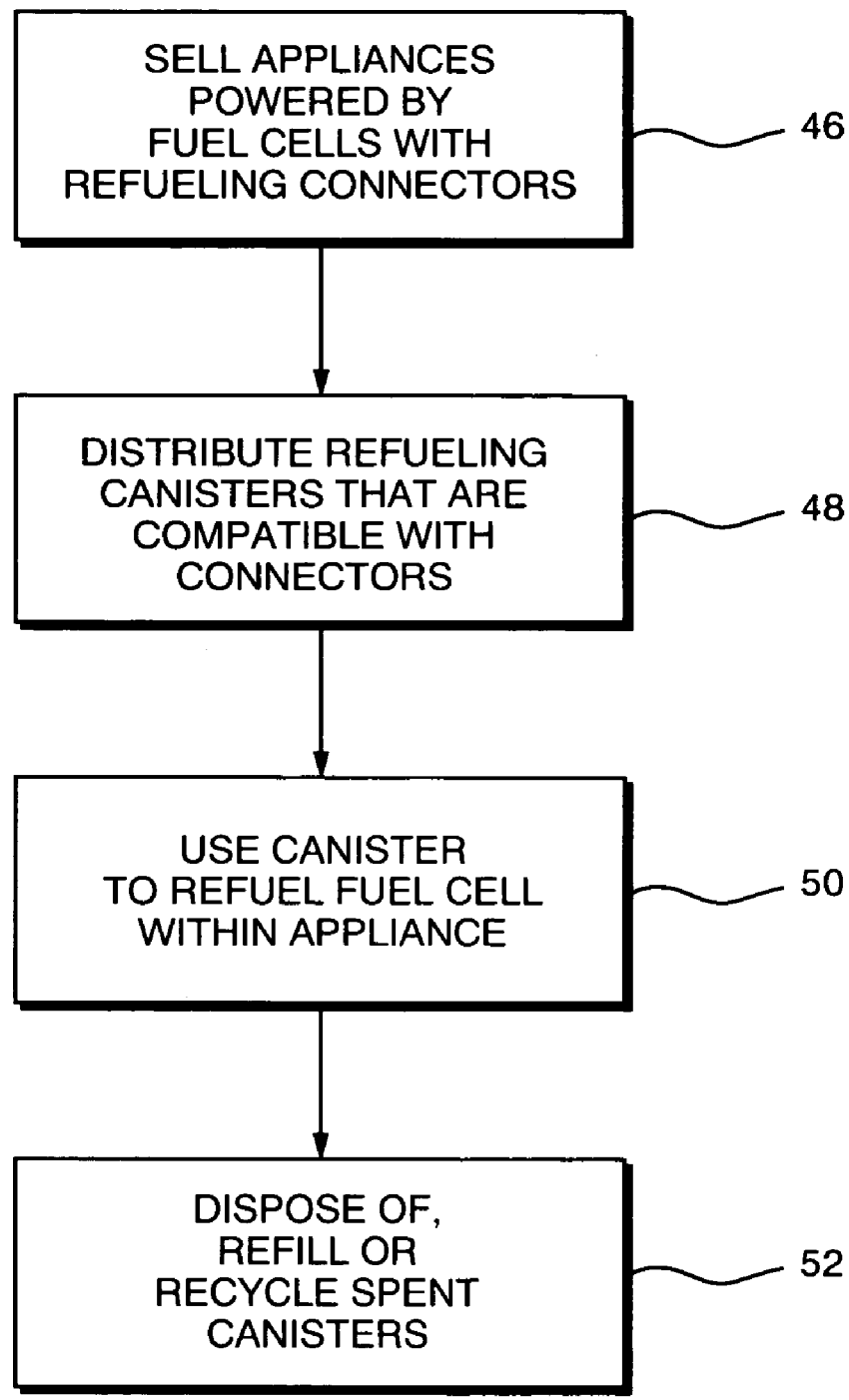
FIG. 3 is a flowchart depicting a method of providing refueling based on refueling canisters such as that shown in FIGS. 1 and 2.

As shown in FIG. 1 a canister 10, embodying the principles of the invention, includes a housing 12 enclosing a chamber 14 containing a liquid fuel for a fuel cell. A passage 16 leads from the chamber 14 to an outlet port 18 in a nozzle 19 by way of a ball valve comprising a ball 20 that is seated against a valve seat 22 by a spring 24. The ball valve thus seals the chamber 14 from the outlet 18 until the valve is opened as described below.

The fuel cell (not shown) includes an inlet comprising an inlet chamber 28 that communicates with a passage 30 leading to the fuel cell's fuel reservoir (not shown). A ball valve comprising a ball 32 that is seated against valve seat 34 by a spring 36 normally seals the reservoir from the atmosphere. The spring constant of the spring 36 is preferably less than that of the spring 24. A tube 38, extending along the axis of the chamber 28 is restrained from outward displacement by a flange 38a that bears against a shoulder 39.

To recharge the fuel cell reservoir from the canister 10, the user inserts the nozzle 19 into the inlet chamber 28. This brings the tube 38 into contact with the ball 22, thereby forcing the ball 22 away from the shoulder 20 and providing a flow path from the chamber 14 to the interior of the tube by way of an aperture 38b. The user then forces a sleeve 42 inwardly (to the left in FIG. 1), thereby moving a plunger 44 to the left and forcing fluid from the chamber 14 into the tube 38. Sufficient force on the sleeve 42 is exerted to cause the fluid pressure to force the ball 32 away from its seat, thereby completing the pathway to the passage 30 and forcing the fuel into the passage and on into the fuel cell reservoir.

When the refueling operation is complete and the user relaxes the force on the sleeve 42, the spring 30 forces the ball 32 against the shoulder 34, thereby once again sealing the fuel cell reservoir. Then, when the nozzle 19 is extracted from the inlet chamber 28, the ball 22 returns to its normal position against the shoulder 22.

The nozzle 19 preferably has an irregular cross section, e.g., as shown in FIG. 2 and the inlet chamber 28 has a corresponding cross section. Only authorized canisters 10 will have this nozzle cross section, thereby preventing recharging of the fuel cell reservoir by way of an unauthorized canister. Fuel cells requiring different fuel compositions may be provided with different inlet chamber cross sections, to accommodate canisters having the proper fuels for those fuel cells. Further examples of mechanical keying arrangements are disclosed in co-pending, commonly assigned application Ser. No. 10/413,982, filed Apr. 15, 2003, which is hereby incorporated by reference.

This keying arrangement can of course be accomplished electronically instead of mechanically by including in the canister circuitry that responds to a signal from the fuel cell, the fuel cell then accepting a fuel only from canisters whose transponders emit the correct response. Detailed examples of electronic keying arrangements are disclosed in co-pending, commonly assigned application Ser. No. 10/414,509, filed Apr. 15, 2003, which is hereby incorporated by reference.

FIG. 3 illustrates in the form a flowchart a method of providing refueling using canisters of the types described above. At step 46, appliances which are powered by fuel cells designed for in situ refueling (i.e., having refueling connectors) are sold into the market. At step 48, authorized refueling canisters that are compatible with the refueling connectors are distributed for sale through traditional retail or on-line sources. At step 50, a user, having purchased a canister, uses it to refuel an appliance. Lastly, at step 52, spent canisters are disposed of or returned to be refilled or recycled.

In accordance with a second embodiment of the invention, instead of using canisters to recharge the fuel cell's fuel reservoir, the fuel reservoir is constructed in the form of a removable cartridge. Detailed examples of such removable cartridges are disclosed in co-pending, commonly assigned application Ser. No. 10/041,301, filed Jan. 8, 2002. As opposed to in situ recharging as described above, a removable cartridge whose fuel supply is exhausted is simply replaced with a full cartridge by the user. Of course, a user need not wait until the fuel supply is exhausted to replace a cartridge, but may instead choose a convenient time when cartridge replacement will not interfere with appliance operation.

Full cartridges are preferably distributed through retail or on-line channels such that users may readily and conveniently purchase them as desired. Depending on a specific design, spent cartridges may be considered disposable or may be refillable/recyclable by way of return to designated centers.

As described above in connection with the first embodiment, mechanical or electronic keying arrangements may be employed to prevent the use of unauthorized cartridges.

Figure 4:
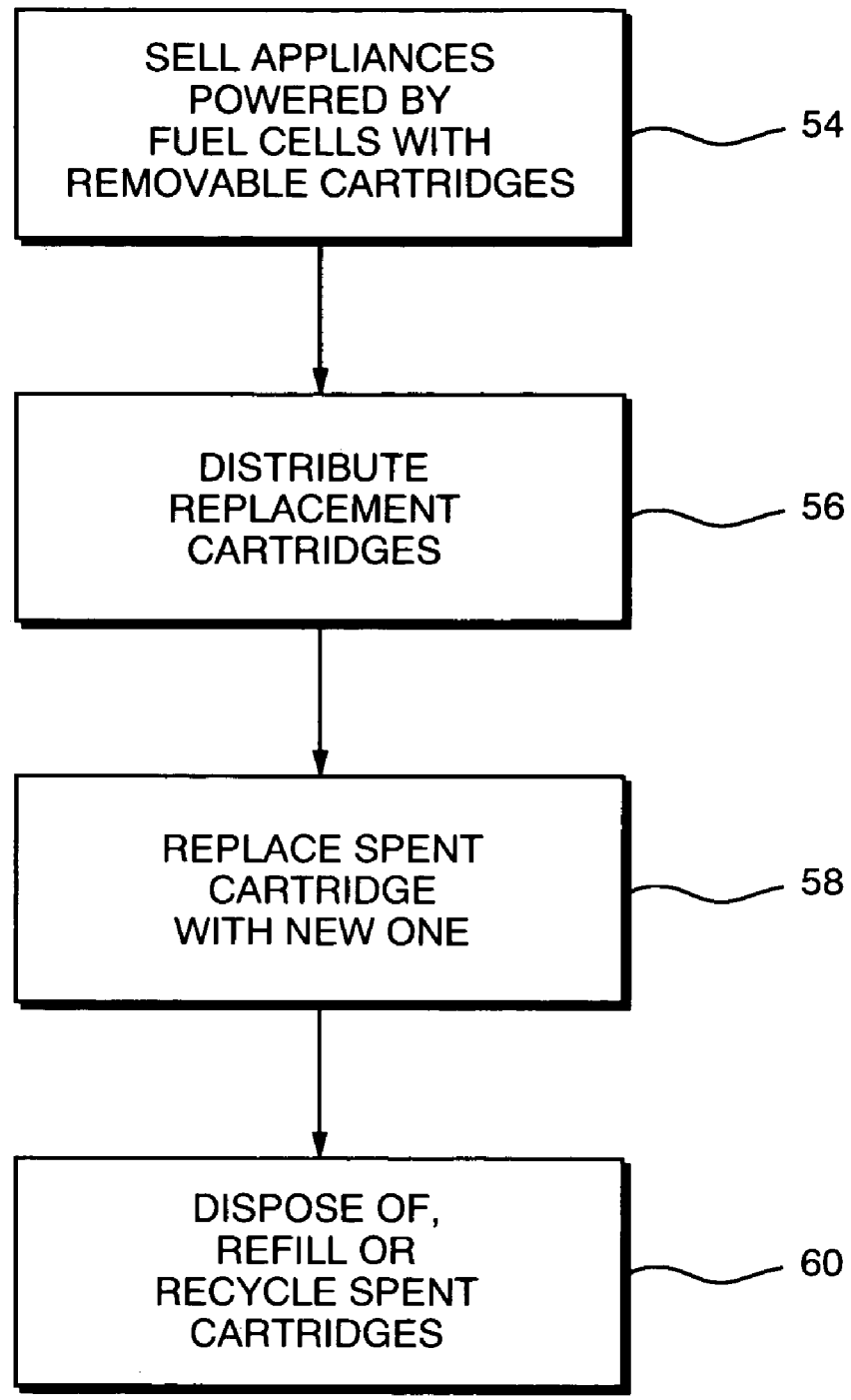
FIG. 4 is a flowchart depicting a method of providing refueling based on removable fuel cartridges.

As shown in the flowchart of FIG. 4, at step 54, in accordance with the second embodiment of the invention, appliances are sold which are powered by fuel cells having removable fuel cartridges. At step 56, authorized replacement cartridges are distributed for sale through traditional retail or on-line sources. At step 58, a user, having purchased a replacement cartridge, uses it to replace a spent cartridge in an appliance. Lastly, at step 60, spent cartridges are disposed of or returned to be refilled or recycled.

It will be understood that the scope of the invention is not limited to any particular canister, cartridge or fuel cell inlet configuration. Rather, the configurations described herein are illustrative of the inventive concept. Indeed, it is believed that the adoption of a standardized specification, at least for the inlet fitting and canister nozzle, will greatly accelerate the integration and availability of fuel cells generally, and greatly simplify the distribution of fuel and the refueling process.

What is claimed is:

1. A method of refueling a direct oxidation fuel cell used to power an electrical appliance, the method comprising the steps of:
    A. providing a substantially full, user-removable fuel cartridge which is integrated with the appliance, in which the cartridge are keyed so that only cartridges having corresponding electrical keys can supply fuel to said fuel cell or fuel reservoir, and said fuel cartridge being coupled to said fuel cell or to a fuel reservoir and conforming substantially to a standardized specification;
    B. removing said fuel cartridge from said appliance when said fuel cartridge is substantially exhausted or at another time; and
    C. installing a substantially full fuel cartridge in said appliance.

2. The method defined in claim 1 in which the cartridges are distributed through conventional retail and/or on-line distribution channels.

3. The method defined in claim 1 in which exhausted cartridges are disposed of.

4. The method defined in claim 1 in which exhausted cartridges are refilled.

5. The method defined in claim 1 in which exhausted cartridges are recycled.

6. The method of refueling a direct oxidation fuel cell as defined in claim 1, including the further step of providing as said electrical key, circuitry in said cartridge that responds to a signal from a fuel cell.

7. The method of refueling a direct oxidation fuel cell as defined in claim 1, including the further steps of:
    A. configuring a transponder on said cartridge that emits a signal of a particular frequency; and
    B. providing a receiver coupled to said fuel cell configured to receive signals from cartridges whose transponders emit the correct signal response, whereby access is provided to supply fuel to said fuel cell from such cartridges as emit said correct signal response, and not other cartridges.

* * * * *